(12) United States Patent
Shetty

(10) Patent No.: US 11,856,545 B1
(45) Date of Patent: Dec. 26, 2023

(54) HIGH PRECISION DISTANCE COMPUTATIONS FOR FTM ESTIMATES

(71) Applicant: Sandeep Shetty, San Jose, CA (US)

(72) Inventor: Sandeep Shetty, San Jose, CA (US)

(73) Assignee: ESPAN SYSTEMS, Las Vegas, NV (US)

( * ) Notice: Subject to any disclaimer, the term of this patent is extended or adjusted under 35 U.S.C. 154(b) by 73 days.

(21) Appl. No.: 17/592,263

(22) Filed: Feb. 3, 2022

Related U.S. Application Data

(60) Provisional application No. 63/145,141, filed on Feb. 3, 2021.

(51) Int. Cl.
*H04W 56/00* (2009.01)
*H04L 43/0864* (2022.01)
*H04W 64/00* (2009.01)

(52) U.S. Cl.
CPC ....... *H04W 56/005* (2013.01); *H04L 43/0864* (2013.01); *H04W 56/009* (2013.01); *H04W 64/003* (2013.01)

(58) Field of Classification Search
CPC ........... H04W 56/004; H04W 56/0045; H04W 56/005; H04W 56/0055; H04W 56/006; H04W 56/0065; H04W 56/009; H04W 64/00; H04W 64/003; H04L 43/0852; H04L 43/0864
See application file for complete search history.

(56) References Cited

U.S. PATENT DOCUMENTS

| | | | | |
|---|---|---|---|---|
| 2021/0136787 | A1* | 5/2021 | Opshaug | H04L 5/0032 |
| 2021/0337531 | A1* | 10/2021 | Manolakos | H04W 72/044 |
| 2021/0368297 | A1* | 11/2021 | Lin | G01S 5/0236 |
| 2021/0377906 | A1* | 12/2021 | Bao | H04W 64/006 |
| 2021/0385766 | A1* | 12/2021 | Manolakos | G01S 5/0236 |
| 2021/0410103 | A1* | 12/2021 | Zhang | H04L 5/0078 |
| 2022/0167276 | A1* | 5/2022 | Kumar | H04W 52/367 |

FOREIGN PATENT DOCUMENTS

| | | | | |
|---|---|---|---|---|
| CA | 2928283 A1 | * | 3/2010 | ............. G01S 1/024 |
| CA | 2898544 A1 | * | 7/2014 | ........ H04W 36/0094 |
| WO | WO-2012075397 A1 | * | 6/2012 | .......... H04W 64/003 |
| WO | WO-2021154848 A1 | * | 8/2021 | ........... G01S 5/0036 |
| WO | WO-2021262918 A1 | * | 12/2021 | ........ H04W 52/0216 |

* cited by examiner

*Primary Examiner* — Kevin D Mew
(74) *Attorney, Agent, or Firm* — Plager Schack LLP; Mark H. Plager; Alexis Saenz

(57) ABSTRACT

A method determines wireless radio locations in a network. The method includes identifying a group of location fixed radios in a network. Radios in the network with known location coordinates and/or known timing bias error values are grouped. RTT values are determined between each radio in the group and radios outside the group. Timing bias error values are determined for each radio outside the group. The timing bias error value for each radio outside the group of radios with known location coordinates and known timing bias error values is based on the determined RTT values. Location coordinates are estimated for each radio outside the group. A request is received for access to the network from a mobile radio device. The known location coordinates and estimated location coordinates of radios are used to determine a distance of the mobile radio device from one of the location fixed radios.

20 Claims, 7 Drawing Sheets

HIGH PRECISION DISTANCE COMPUTATIONS FOR FTM ESTIMATES

CROSS REFERENCE TO RELATED APPLICATIONS

This application claims benefit under 35 U.S.C. § 119(e) of U.S. Provisional Application having Ser. No. 63/145,141 filed Feb. 3, 2021, which is hereby incorporated by reference in its entirety.

BACKGROUND

Currently, in Wi-Fi chips, the estimation of the transmission and reception times may include a bias error that can dramatically affect location estimates based on these values. As communication protocols call for increased accuracy in locating devices, the field is finding that the current resolution of error is beyond the error margins requirements of newer protocols.

For Wi-Fi systems that support FTM (Fine Timing Measurements) in the field, their location estimates are inaccurate because of the timing bias and error estimates reported by the Wi-Fi radio. One approach includes manually finding radios and documenting performance for location estimates. Another approach includes calculating and manually attaching timing error values directly to a radio device at the manufacturing stage. As can be imagined, these approaches are very time consuming from a labor perspective and impractically expensive to implement considering the number of networks available and the number of radios available in each network.

SUMMARY

In one aspect of the subject technology, a method for determining wireless radio locations is provided. The method includes identifying a group of location fixed radios in a network. One or more fixed radios in the network with known location coordinates are identified. The radios with known location coordinates are associated into a group. One or more sets of three radios are constructed from the group of radios with known location coordinates. A round trip time (RTT) measurement is performed for each radio in the sets of three radios. Timing bias error values are calculated for radios in the sets of three radios. Radios with calculated timing bias error values are moved into the group of radios with known location coordinates and known timing bias error values. RTT values between each radio in the group of radios with known location coordinates and known timing bias error values and radios outside the group of radios with known location coordinates and known timing bias error values are determined. Timing bias error values are determined for each radio outside the group of radios with known location coordinates and known timing bias error values. The timing bias error value for each radio outside the group of radios with known location coordinates and known timing bias error values is based on the determined RTT values. Location coordinates are estimated for each radio outside the group of radios with known location coordinates and known timing bias error values.

In another aspect, a computer program product for determining wireless radio locations is provided. The computer program product comprises one or more computer readable storage media, and program instructions collectively stored on the one or more computer readable storage media. The program instructions include identifying a group of location fixed radios in a network. One or more fixed radios in the network with known location coordinates are identified. The radios with known location coordinates are associated into a group. One or more sets of three radios are constructed from the group of radios with known location coordinates. A round trip time (RTT) measurement is performed for each radio in the sets of three radios. Timing bias error values are calculated for radios in the sets of three radios. Radios with calculated timing bias error values are moved into the group of radios with known location coordinates and known timing bias error values. RTT values between each radio in the group of radios with known location coordinates and known timing bias error values and radios outside the group of radios with known location coordinates and known timing bias error values are determined. Timing bias error values are determined for each radio outside the group of radios with known location coordinates and known timing bias error values. The timing bias error value for each radio outside the group of radios with known location coordinates and known timing bias error values is based on the determined RTT values. Location coordinates are estimated for each radio outside the group of radios with known location coordinates and known timing bias error values.

In yet another aspect, a network location computer server is provided. The server includes a network connection; one or more computer readable storage media; a processor coupled to the network connection and coupled to the one or more computer readable storage media; and a computer program product comprising program instructions collectively stored on the one or more computer readable storage media. The program instructions include identifying a group of location fixed radios in a network. One or more fixed radios in the network with known location coordinates are identified. The radios with known location coordinates are associated into a group. One or more sets of three radios are constructed from the group of radios with known location coordinates. A round trip time (RTT) measurement is performed for each radio in the sets of three radios. Timing bias error values are calculated for radios in the sets of three radios. Radios with calculated timing bias error values are moved into the group of radios with known location coordinates and known timing bias error values. RTT values between each radio in the group of radios with known location coordinates and known timing bias error values and radios outside the group of radios with known location coordinates and known timing bias error values are determined. Timing bias error values are determined for each radio outside the group of radios with known location coordinates and known timing bias error values. The timing bias error value for each radio outside the group of radios with known location coordinates and known timing bias error values is based on the determined RTT values. Location coordinates are estimated for each radio outside the group of radios with known location coordinates and known timing bias error values.

BRIEF DESCRIPTION OF THE FIGURES

The detailed description of some embodiments of the invention is made below with reference to the accompanying figures, wherein like numerals represent corresponding parts of the figures.

DETAILED DESCRIPTION OF CERTAIN EMBODIMENTS

Figure 1:
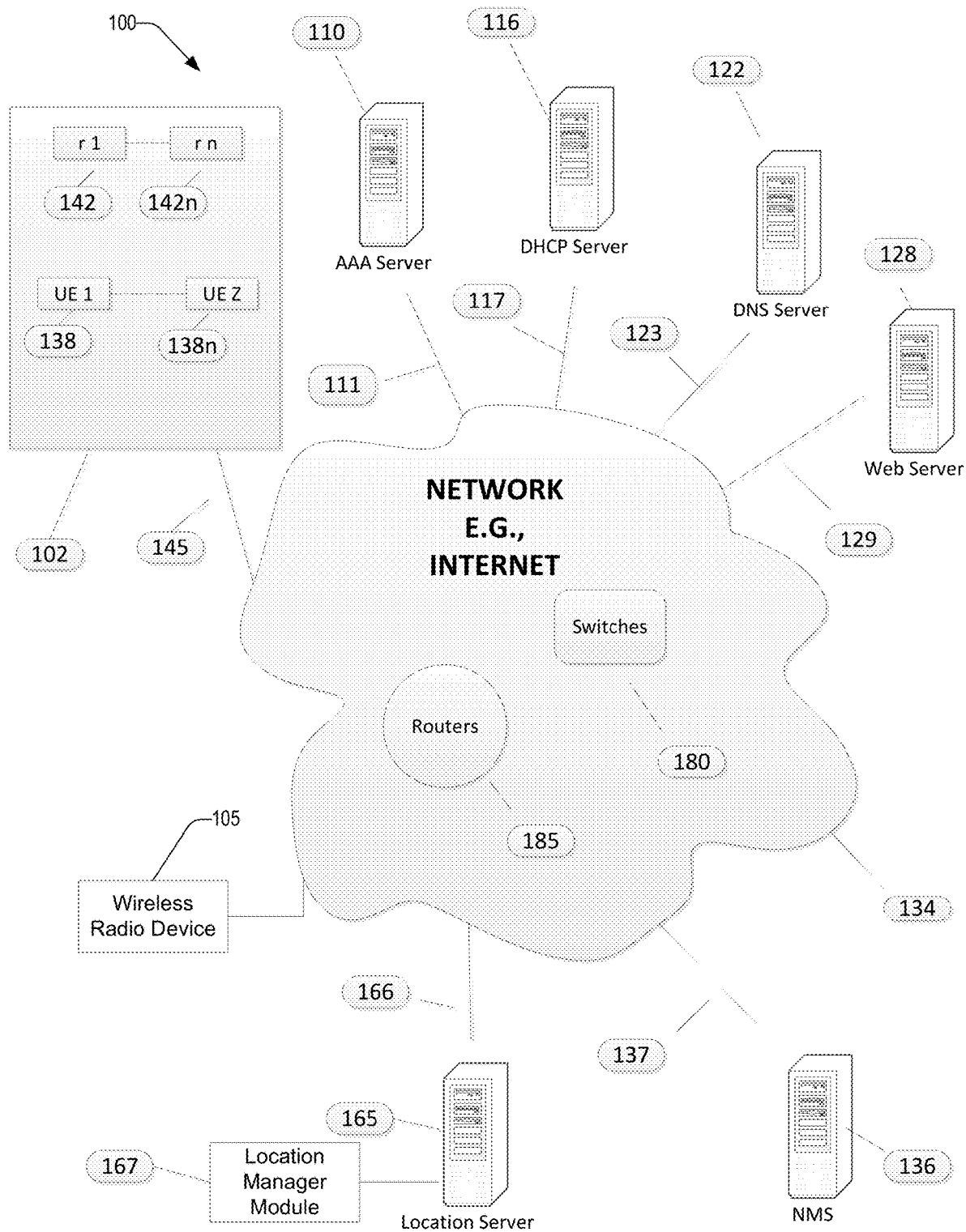
FIG. 1 is a diagrammatic view of a wireless radio system according to an embodiment of the subject technology.

In general, embodiments of the disclosed subject technology generate high precision distance computations for Fine Timing Measurements (FTM) estimates by limiting the influence of random error and removing estimated bias terms from signal computations. Illustrative embodiments use round trip time (RTT) measurements, which under previous technology could not be used under newer protocols because the error involved was too high to accurately locate radios. However, aspects of the subject technology accurately estimate the timing error and bias of the radios by accurately modelling the error and using minimal administrative assistance. An illustrative embodiment includes a method in which elements that contribute bias in a measuring system may be quantified and ameliorated to produce results superior to current radiolocation techniques.

As an illustrative embodiment, aspects of the subject technology are disclosed for compatibility with the IEEE 802.11 2016 FTM protocol. The protocol defines fields that carry information with pico-second resolution to estimate the inflight one and two way transit time between two WiFi devices. It will be appreciated that the solutions offered by the subject technology are readily transparent because of the error margin requirements under this protocol. The subject technology is able to mitigate the inaccuracy in current radio locating processes within a network by mitigating bias error terms associated with FTM. However, it will be understood that the subject technology may extend beyond said protocol in applications where the resolution of signal location benefits from reducing error bias.

It should also be appreciated that embodiments may be automated, which eliminates the need for costly approaches that use for example, manual radio finding and documentation. Still yet, some aspects of the subject technology eliminate the need to document error values at the manufacturing level by determining the timing error values while radios are operating in the network. And so, there are considerable implementation costs saved. Moreover, radios may be readily interchanged between networks and error values determined using previously calculated values or new calculations as the radio is added to a network.

Definitions

FTM: The 802.11 2016 Fine Timing Measurement protocol, FTM. At base, the protocol is like ping with extensions for information. WiFi devices observe and compute values and place it in the FTM provided receptacles. The fields have picosecond resolution. FTM, the FTM protocol, and the protocol are all terms used interchangeably below.

$r_i$: An individual radio with name i, and associated administrative information. In general, "i" is the base mac address associated with the radio.

$r_{i,j}$: The channel between $r_i$ and $r_j$.

Errors: Various errors occur and some may have their values estimated by repeated observations resulting from FTM protocol exchanges. Through mechanisms identified in the subject disclosure below, repetitive observations reduce the re, and pe terms to negligible values. Without the noise of re and pe, the bias term becomes visible, and so may be eliminated as a component to the over the airtime. Without estimation, bias incurs unacceptable error on estimated time of flight between two radios, $r_i$ and $r_j$. Some errors may only be detected but not estimated. These are excluded from consideration.

Random error (re) and residual error (resid): refers to random error in FTM observations.

Precision error (pe): refers to precision error. For the FTM protocol, precision of the FTM protocol is in units of picoseconds.

$u_{tk}$: Estimated constant bias error (picosecond) in time observation incurred by FTM frame transmission at radio $r_k$.

$u_{ri}$: Estimated constant bias error (picoseconds) in time observation incurred by FTM frame reception at $r_i$.

$u_{bk}$: the sum of $u_{tk}$ and $u_{rk}$.

Observed over the air round trip time, rtt(r, $r_j$): rtt($r_i$, $r_j$) is the mean result of many over the air FTM trials between radios $r_i$ and $r_j$. The number of trials is meant to reduce pe and resid to acceptably low values. rtt($r_i$, $r_j$) includes bias terms close to their correct values. Precision errors are not significant enough to affect the utility of the method, and the residual error is absorbed in the u terms, and as such is noted here for completeness only.

Nucleus N: the set of all $r_n$ radios in N whose coordinates and biases are either known have been estimated by the method described.

Beginning Set B: B, the set of radios for which locations are desired. Distances from radios in B are determined by radios in N.

Admin set A: the set of radios whose location is known, and may also include known bias terms for any $r_i$ in the set.

Actual over the air round trip time, att($r_i$, $r_j$): att($r_i$, $r_i$) is the actual over the airtime between radios $r_i$ and $r_i$. A single instance of the formula follows:

$$att(r_a,r_b)=rtt(r_a,r_b)-(u_{ba}+u_{bb})$$

Example Architecture

Referring now to FIG. 1, an example system 100 is shown that is implemented in one or more of the disclosed embodiments. System 100 includes a plurality of radios (r) 142-142n (sometimes referred to generally as "radio or radios 142"). In various embodiments, a WiFi radio performing both transmit and receive operations, or any other radio that provides network access and has the capability to determine distance using round trip time estimations, or any other wireless device capable of providing network access. System 100 also includes Authentication, Authorization and Accounting (AAA) server(s) 110, Dynamic Host Configuration Protocol (DHCP) server(s) 116, Domain Name System (DNS) server(s) 122, one or more Web server(s) 128, a network management system (NMS) 136. These servers are coupled together via a network 134 (e.g., the Internet and/or an enterprise intranet). The location server 165 may include a location manager module 167 that includes executable software files that coordinate radio locations for transmission and receipt of wireless signals. The location server 165 runs the processes described below for determining error and eliminating bias error in locating radios. The server 165 also programs the radios to execute RTT between radio pairs. The network 134 includes a plurality of routers 185 and a plurality of switches 180. A network communications link 111 couples the AAA server(s) 110 to the network 134. A network communications link 117 couples the DHCP server(s) to the network 134. A network communications link 123 couples the DNS server(s) to the network 134. A network communications link 129 couples the Web server(s) to the network 134. A network communications link 137 couples the network management server(s) 136 to the network 134. A network communications link 166 couples the server(s) 165 to the network 134.

In the example system 100 sets of radios 142-142n are located on sites 102. Only a single site 102 is shown for sake of illustration, however it will be understood that multiple sites 102 may be present in the system 100. The site 102 is connected to the network 134 via network communications link 145. Some of the UEs 138-138n are wireless transmitters and receivers, and move throughout system 100.

Each one of the servers, routers, switches, radios, Ues, NMS, and other servers attached to the network in some embodiments, include a system log or an error log module wherein each one of these devices records the status of the device including normal operational status and error conditions.

At least some of the disclosed embodiments determine that a wireless radio device 105 is trying to locate one or more radios 142 to connect to the network 134. In one illustrative example, the wireless radio device 105 is a mobile smartphone and the radios 142 are access points on the site 102. The system 100 is trying to locate the position of the wireless radio device 105. In some embodiments, the wireless radio device 105 may be moving throughout an area (whether indoor or outdoor relative to the fixed radios 142). The "ping" and "pong" signals from the wireless radio device 105 and the location manager 167 of the system 100 may be constantly updating based on which radios 142 are in the most accurate position to provide communications between the wireless radio device 105 and the network 134.

The example wireless devices of FIG. 1 include multiple radio transmitters and receivers (not shown) capable of transmitting and receiving signals at numerous frequencies, e.g., over the 2.4, 5 GHz, and or other frequency bands. One or more of the radios use a plurality of transmit elements and/or receive elements (e.g., antennas) to transmit and receive the signals to and from other wireless receivers and transmitters.

BIAS

In general, a radio ($r_k$) has the following per unit biases:

$u_{T\_rk}$, —transmit bias $u_{R\_rk}$, —receive bias

True round trip airtime is symmetrical:

$$att(r_a, r_B) = att(r_a, r_B)$$

att($r_a$, $r_B$) can be expressed as the sum of the measured round-trip time rtt($r_a$, $r_b$) and the per unit radio bias:

$$att(r_a, r_b) = rtt(r_a, r_b) - (u_{ta} + u_{ra} + u_{tb} + u_{rb})$$

$$att(r_a, r_b) = rtt(r_a, r_b) - (U + u_{bb})$$

Where: $u_{bk} = u_{tk} + u_{rk}$

It may not be known whether the chipset and model of a phone informs the error likelihood of the same model of phone. Underneath these terms, may be a base level of bias and a per unit of bias. In order for there to be base bias, it may have been necessary for the manufacturer to have not worked to eliminate it appropriately.

In one aspect of the subject technology, a base bias and per phone bias is determined through additional statistical analysis by computing elements in the system. In an illustrative embodiment, base bias, (that is bias that was not eliminated by the manufacturer) is determined, and per client bias. As will be appreciated, the utility of knowing base bias is that it can be used to reduce bias error in clients of the same model. To the extent that manufacturing changes during the production of a client change the bias characteristics of some models, the instant disclosure describes techniques outlined herein that identify contiguous sections of addresses used by the manufacturer with manufacturing line changes.

Once a client is identified as belonging to a group of MAC addresses, clients associated with manufacturing changes that modify either base bias or individual manufacturing bias can be determine with sufficient exposure to the characteristics of the contiguous group of MAC addresses, and therefore to identify known sections of MAC addresses adhering to manufacturing processes that affect either per unit bias or manufacturing across a contiguous set of MAC addresses for a client of a specific make and model.

WiFi Fine Time Measurement

Figure 2:
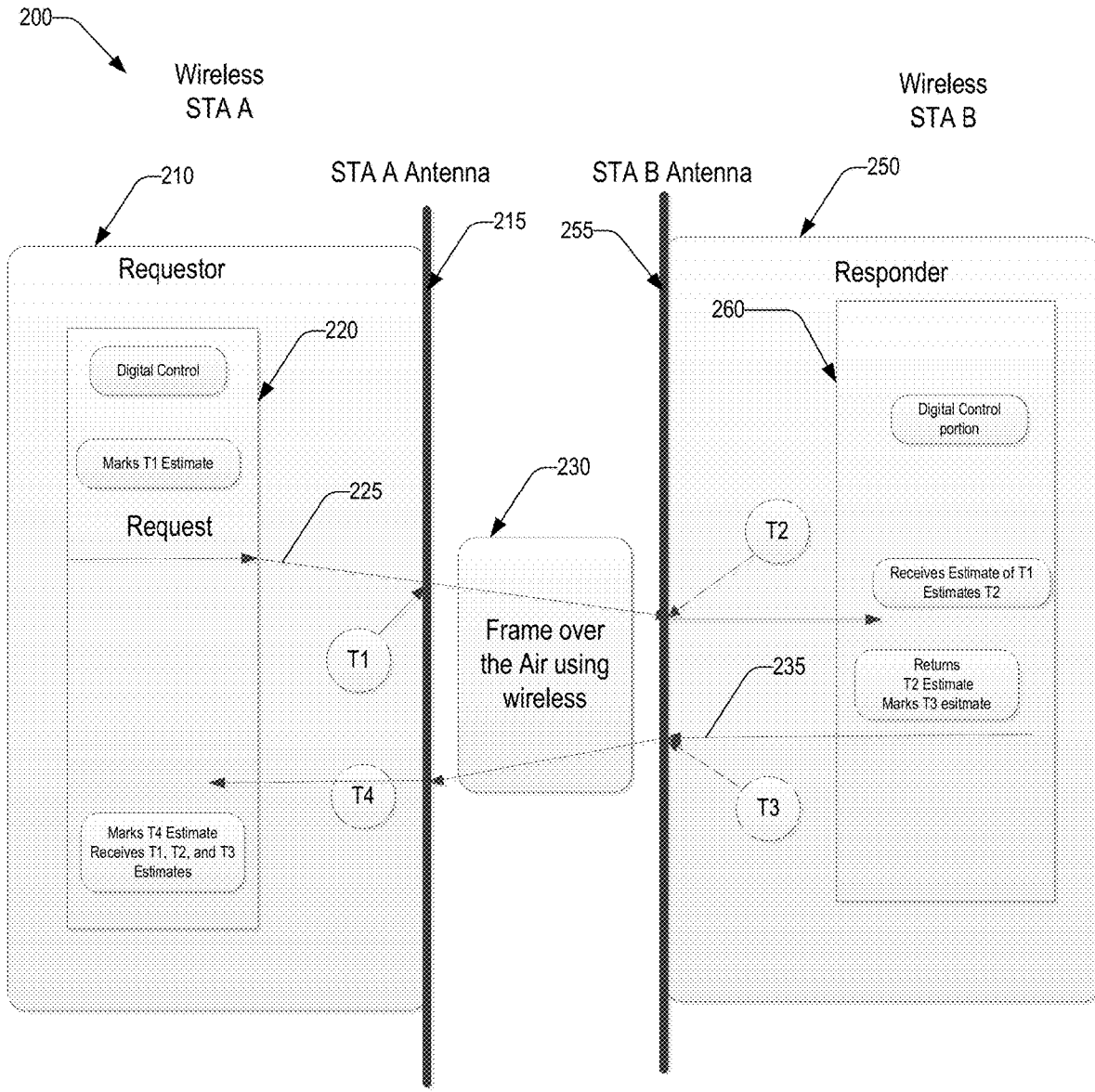
FIG. 2 is a block diagram of an FTM based exchange according to an embodiment of the subject technology.

Referring now to FIG. 2, an FTM exchange between two devices is shown according to an illustrative embodiment. The system 200 shown may operate under the IEEE 802.16 6.3.58.1 protocol for purposes of illustrating the subject technology. In the embodiment shown, the device 210 ("Station A" or "STA A") may be, a mobile radio (for example, a mobile telephone). The device 250 ("Station B" or "STA B") may be a stationary radio, for example, an access point installed on the premises. In the exchange described below, the device 210 may be the requestor entity, initiating a ranging procedure with respect to the device 250 in order to determine its physical location. The device 250 may then be considered the responder entity in this exchange. It is understood that the device 210 may be performing this exchange between different fixed radios on the premises, but for sake of illustration, only a single instance with one fixed radio is described. The description of the operation that follows may sometimes refer to the device 210 as the "mobile phone 210" and to the device 250 as the "radio 250" to aid the reader in following the illustrative scenario.

While the description that follows is based on a mobile radio to stationary AP setup, some embodiments may operate under other variations of the devices. However, as shown, the device 210 is generally a wireless radio that includes an antenna 215 and a controller module 220 that process signals transmitted from and received by the device 210. The device 250 is generally a wireless radio that includes an antenna 255 and a controller module 260 that process signals transmitted from and received by the device 250. The location server 165 (See FIG. 1) may receive the signal data from the device 210 and/or the device 250 to perform radio location and/or error elimination as described in more detail below.

The time a WiFi signal takes to travel in air from mobile phone 210 to the WiFi radio 250 is proportional to the actual distance between them (about 3.3 nanoseconds per meter). The ranging request signal from the phone 210 to the radio 250 is called out as 225. The exchange data is shown as a frame 230. The reply/return signal from the radio 250 to the phone 210 is called out as 235. Since the internal clocks in the phone 210 and the radios(s) 250 are not synchronized, a one-way time measurement cannot be based on differences between timestamps at the two ends. Fortunately, the difference in timestamps when the signal travels in the reverse direction is affected in the opposite way by the clock offset. As a result, the round trip time (RTT) can be obtained without having to know the clock offsets—by simple addition and subtraction of four times: RTT=(t4−t1+t2−t3). Importantly, the second FTM "Ping" from the access point includes the time-of-departure t1 and the time-of-arrival t4 at the access point. The round trip time measurements are not perfectly accurate, being subject to various types of measurement error, RF interference as well as the positions and motions of objects in the environment. Repeated measurements may improve the quality a bit. With a burst of interchanges, only round-trip times can be determined.

Knowing the round trip times to 3, 4, or more radios 250 in known positions allows one to estimate the position of the smartphone 210 given the positions of the radios 250. Conversely, a radio 250 can be located given round trip times from a smartphone 210 in 3, 4, or more known positions. If neither smartphone 210 nor access point 250 positions are known initially, one can perform simultaneous localization and mapping (SLAM).

Methodology

The following includes an illustrative process and sub-processes for determining error measurements in a FTM exchange between two radios. The error measurements are used to improve the accuracy of location determination for one or both radios in the exchange. At a high level, embodiments show how to group radios in an area that will provide accurate location performance. At more granular levels, embodiments determine error characteristics of radios. Once error characteristics are determined, the best sets of radios to locate client positions are determined. The process assumes a plurality of radios communicating with a mobile radio (for example, a wireless smartphone). In an exemplary embodiment, round trip time (RTT) measurements for radios are calculated. Bias terms associated with exchanges between radios are determined and accounted for in distance estimates. Accordingly, embodiments may use the improved distance estimates to selectively use one group of radios to locate a mobile radio over other groups of radios.

Figures 3A, 3B:
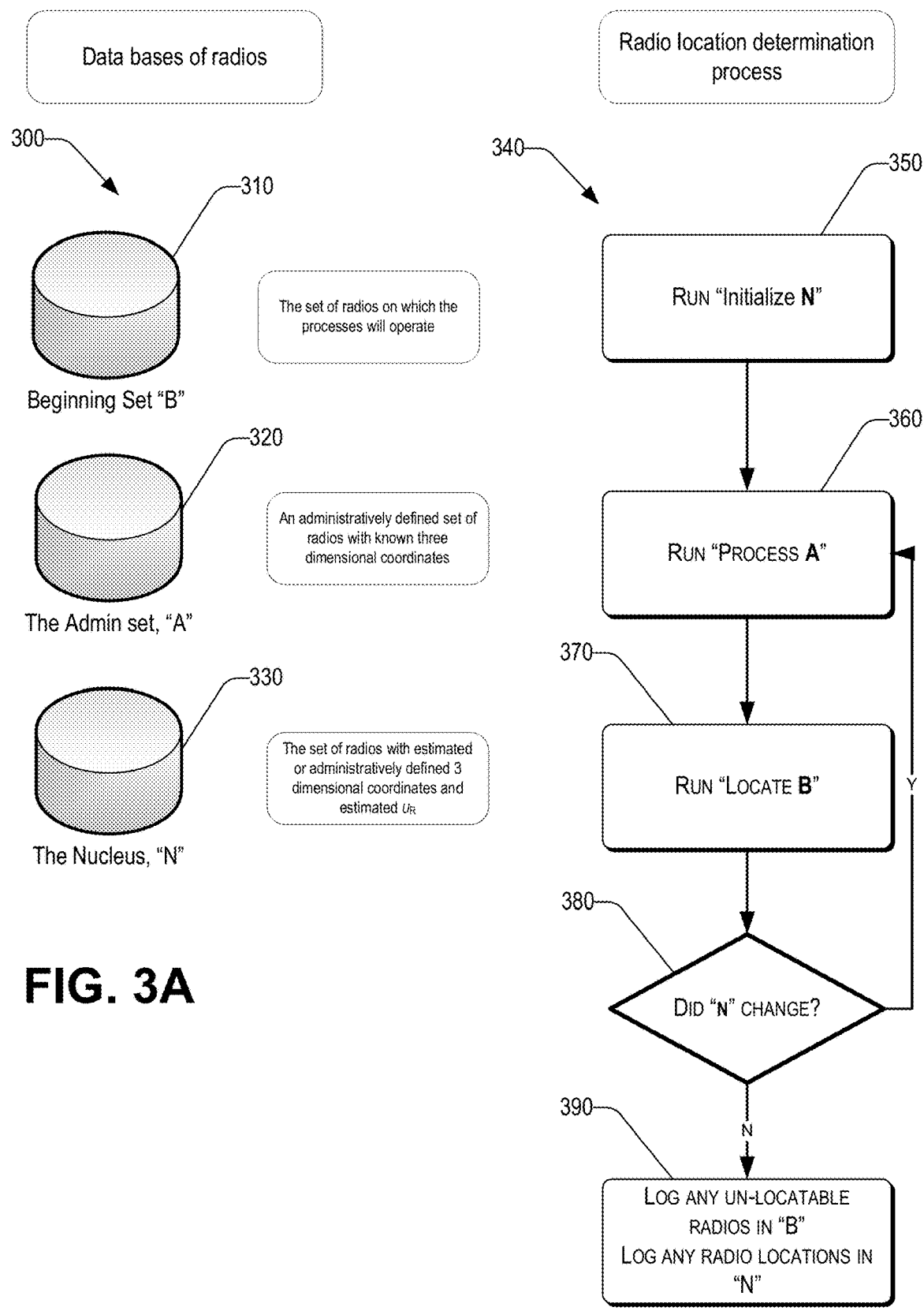
FIG. 3A is a diagram of sets of radios for processing according to an illustrative embodiment of the subject technology.
FIG. 3B is a flowchart of a process for determining radio locations according to an illustrative embodiment of the subject technology.

FIGS. 3A and 3B are shown concurrently to illustrate how sets of radios are processed to provide the improved FTM estimates of the subject technology. FIG. 3A includes a set 300 of radios. The set 300 generally includes a set 310, labeled as "Beginning Set 'B'". The set 310 may be a set of radios on which the processes will operate. The set 310 may include each available radio on the premises/area or a sub-set of the radios available and identified by the system. The radios in set 310 are generally suitable for processing and are tagged, labeled, etc. as having unknown locations and bias. The set 320, labeled as the "Admin Set 'A'", may be an administratively defined set of radios with known dimensional coordinates, and even known bias terms. In illustrative embodiments, coordinates are based in three dimensions (for example, x, y, z, coordinates of three space cartesian coordinate system). Initially, the set 320 may be empty, with radios meeting certain criteria after processing, being moved into the set 320. The set 330, labeled as the "Nucleus 'N'", may be a set of radios with estimated or administratively defined three dimensional coordinates and estimated lib. The set 330 contains an initial administrative set of radios with known locations and whose biases are calculated as delineated farther below.

For the process 340, in general, each iteration determines all radios in set "B" whose location and bias can be estimated by the nucleus, N, and are then designated as members of set "N". This way, any error incurred by radio parameter estimation is kept to the minimum hops from the nucleus "N". Once no more radios in "B" can have their parameters determined by the radios in the nucleus "N", the process terminates.

At a high level, the process 340 includes running sub-process 350 initializing the content of set "B". In block 360, radios in Set "A" are processed for measurement terms including bias. To ensure the most maximal set of administrative radios in "N", running the process "A" prior to running the process Locate "B", maximizes radios in "N" with radios of known accurate locations. In block 370, a process locates the distances of radios in Set "B". The operations in blocks 360 and 370 may be performed until either the set "B" is empty, or none of the remaining radios in set "B" can have their distances determined. In this case, the administrator precisely identifies locations of additional linking radios, so the process 340 can successfully terminate with no radios in set "B".

The Radio Sets

In some embodiments, the following sets may have an initial number of radios included. The initial members may be determined by the location server 165 based on criteria. As will be described in the disclosure that follows, the membership in any one set may change or evolve as information about radios becomes learned and radios are moved from one set into another.

The Beginning Set "B": This set is the set of radios for which locations are desired. The mechanism by which the beginning set is determined is not specified. It may be an administratively defined set, or there may be mechanisms that operate so as to determine the radio locations.

The Admin Set "A": This set is the set of radios that have additional information associated with them, for example, the three-dimensional coordinates of the radios, but it may also include any or all of the per radio $u_x$ bias terms.

The Nucleus "N": This set is the set of radios for which three dimensional coordinates and at minimum the bias term $u_b$ is known or estimated.

Each radio has storage associated with it to maintain associated RTT results, and bias terms.

Overview of the Method

Initially there are two sets provided: the Admin set "A", and the Beginning set "B". Any radios in "A" also in "B" are removed from "B", yielding disjoint sets "A" and "B". The radios in "A" are evaluated, and any that have known bias terms or whose bias terms may be estimated are added to the Nucleus, set "N".

Iteratively, radios in set "A" are evaluated to identify the bias term for the radio. If the bias term may be identified, the radio is removed from "A" and added to "N". In some embodiments, RTT measurements may be made for each radio in "B" to all radios in "N". Once this process is complete for all radios in "B", the radios in "B" whose bias and 3-dimensional coordinates may be determined are removed from "B" and added to "N". While the steps described throughout may describe a step dedicated to determining timing bias or determining radio location, some embodiments may determine bias terms and locations simultaneously.

The set "N" is evaluated to determine whether it has added radios. If so, the process continues by returning to the step evaluating radios in set "A" to identify bias terms. As should be appreciated, the set "N" may grow as new radios with additional information (for example, as unknown terms become solvable) are found and added to the set "N". Otherwise, the iteration terminates.

When the iteration terminates, logs may be prepared that indicate those radios remaining in "B", and are flagged as un-locatable. Those radios in "A" and in "N" are logged with their known or computed locations and bias terms.

Figures 4A, 4B:
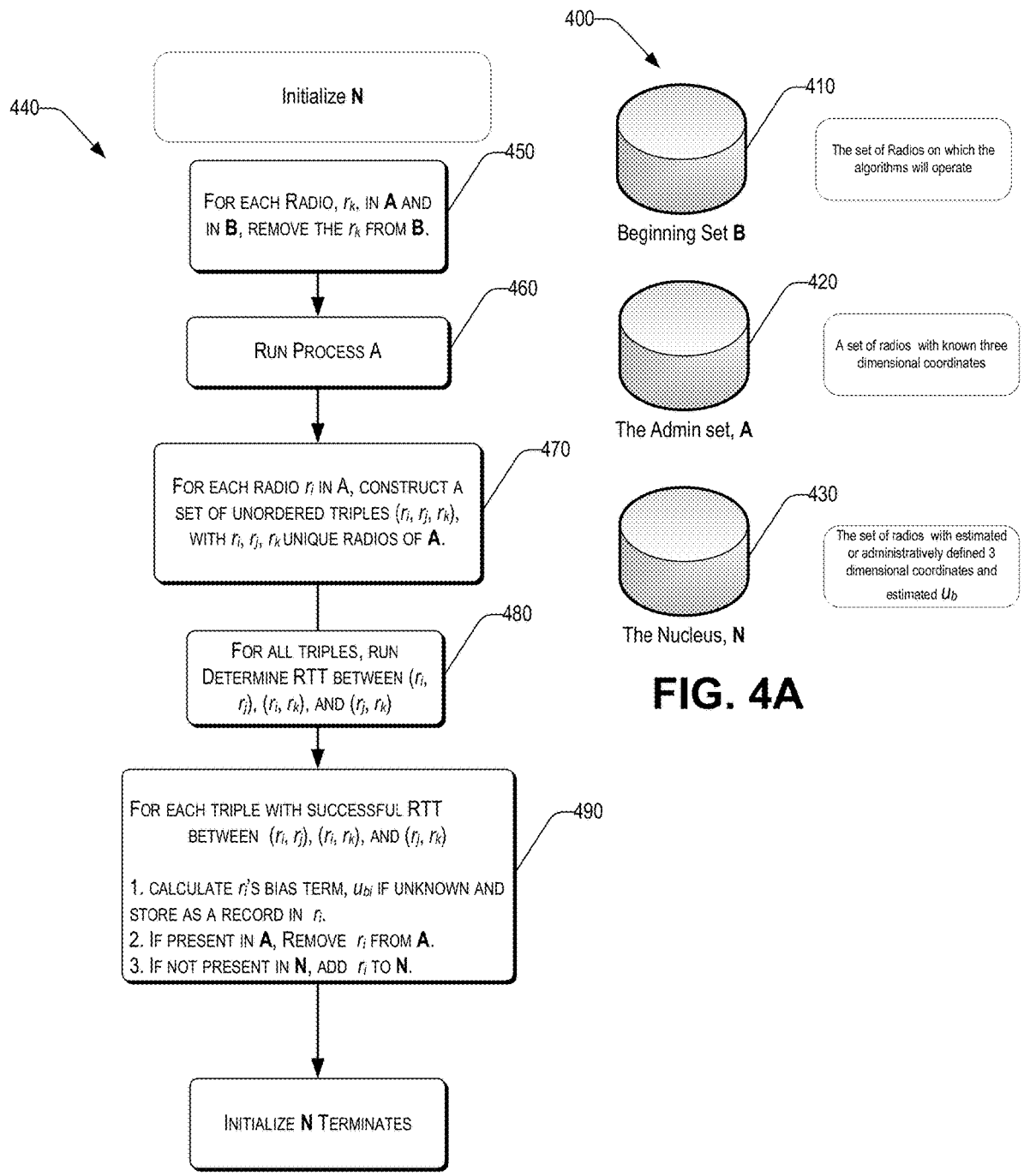
FIG. 4A is a diagram of sets of radios for processing according to an illustrative embodiment of the subject technology.
FIG. 4B is a flowchart of a process for initializing the formation of a nucleus set of radios according to an illustrative embodiment of the subject technology.

Referring now to FIGS. 4A and 4B, a sub-process 440 for initializing a nucleus set "N" of from a set of radios 400 is shown according to an illustrative embodiment. The set 400 is similar to the set 300 of FIG. 3 with like elements called out using the 400 series.

Unknowns

Each radio has a series of knowns and unknowns. These include:

Coordinates. Below, coordinates are chosen within a three-dimensional cartesian coordinate system (x, y, z), or any equivalent systems.

Bias Terms. These are distinct as $u_r$ and $u_t$, and summed generate $u_b$.

$u_r$ is a bias term that indicates a most likely estimate that is probabilistically bound across all receptions, with time units. When used to signify a specific radio, the notation $u_{ri}$ is used, where "i" indicates radio $r_i$.

$u_t$ is a bias term that indicates a most likely estimate that is probabilistically bound across all transmissions with time units. When used to signify a specific radio, the notation $u_{ti}$ is used, where "i" indicates radio $r_i$.

$u_b$ is the sum of the terms $u_r$ and $u_t$ and may be necessary to solve mathematical equations to identify other terms. It is a most likely estimate that is probabilistically bound for errors in both reception and transmission. It uses time units. When used to signify a specific radio, the notation $u_{bo}$ is used, where "i" indicates radio $r_i$.

FIG. 4B describes a process 440 for an initialization of the nucleus, "N". Process 400 is a detailed breakdown of block 350 shown in FIG. 3B according to an illustrative embodiment. In general, the process to initialize the nucleus set "N" performs seeding by identifying triples (sets of three radios) in the administrative set "A". At the start of the process 440, the set "N" may be an empty set. For each radio, $r_k$, in set "A" and in set "B", remove 450 the radio $r_k$ from set "B". The beginning step 450 creates disjoint sets "B" and "A", removing those radios in "A" should they exist in "B". The process for "A" is run 460. The process "A" is run so that in the event some radios in administrative set "A" have known bias terms, these radios may be immediately moved to "N", (as shown in the first step of FIG. 5 describing process "A"). For example, the step 460 processing "A" may include migrating radios to set "N" for radios in set "A" that: have a known bias term and, whose bias term may be and is determined by some radio in set "N". Process "A" then loops to add any additional radios in set "A" that may now perform RTT with radios in set "N" (as shown further into the process of FIG. 5). Process 440 then finds triples whose RTT can be calculated. For each radio $r_i$ in set "A", construct 470 a set of unordered triples $(r_i, r_j, r_k)$, with $r_i, r_j, r_k$ unique radios of set "A". For all triples, determine 480 RTT between $(r_i, r_j)$, $(r_i, r_k)$, and $(r_j, r_k)$. While sets of three radios are described. It will be understood that some embodiments may use the same or similar calculations for four or more radios. Step 480 identifies radios in set "A" whose bias terms may be calculated. For each triple with successful RTT between $(r_i, r_j)$, $(r_i, r_k)$, and $(r_j, r_k)$:

calculate radio $r_i$'s bias term, $u_{bi}$ if unknown and store as a record in $r_i$;
if present in set "A", remove radio $r_i$ from set "A";
if not present in nucleus set "N", add $r_i$ to set "N". In step 490, the bias term for a radio being evaluated is estimated, and the radio is removed from set "A" and placed in set "N". The process 440 may terminate when the conditions for 490 are satisfied. Recorded data may be stored in memory with a file associated with the radio in the location manager 167 of location server 165 (FIG. 1).

As will be understood on review, the process 440 calculates the unknowns listed above, using linear equations in some cases, and non-linear equations in others. There are use cases in which various unknowns may be eliminated. For instance, the z coordinate or equivalent in the cartesian coordinate system may often have identifiable or uniform values, and so may be eliminated from the calculations, removing an unknown. It may be unnecessary in some cases to calculate $u_r$ and $u_t$ terms above, as they do not advance the important determination of the location; only term $u_b$ is necessary.

Mechanisms may be used that estimate the $u_r$, $u_t$, and $u_b$. These are not detailed here, but simply the following note is made, that for each term that may be assumed, or estimated, the method may compute locations with fewer equations.

Figure 5:
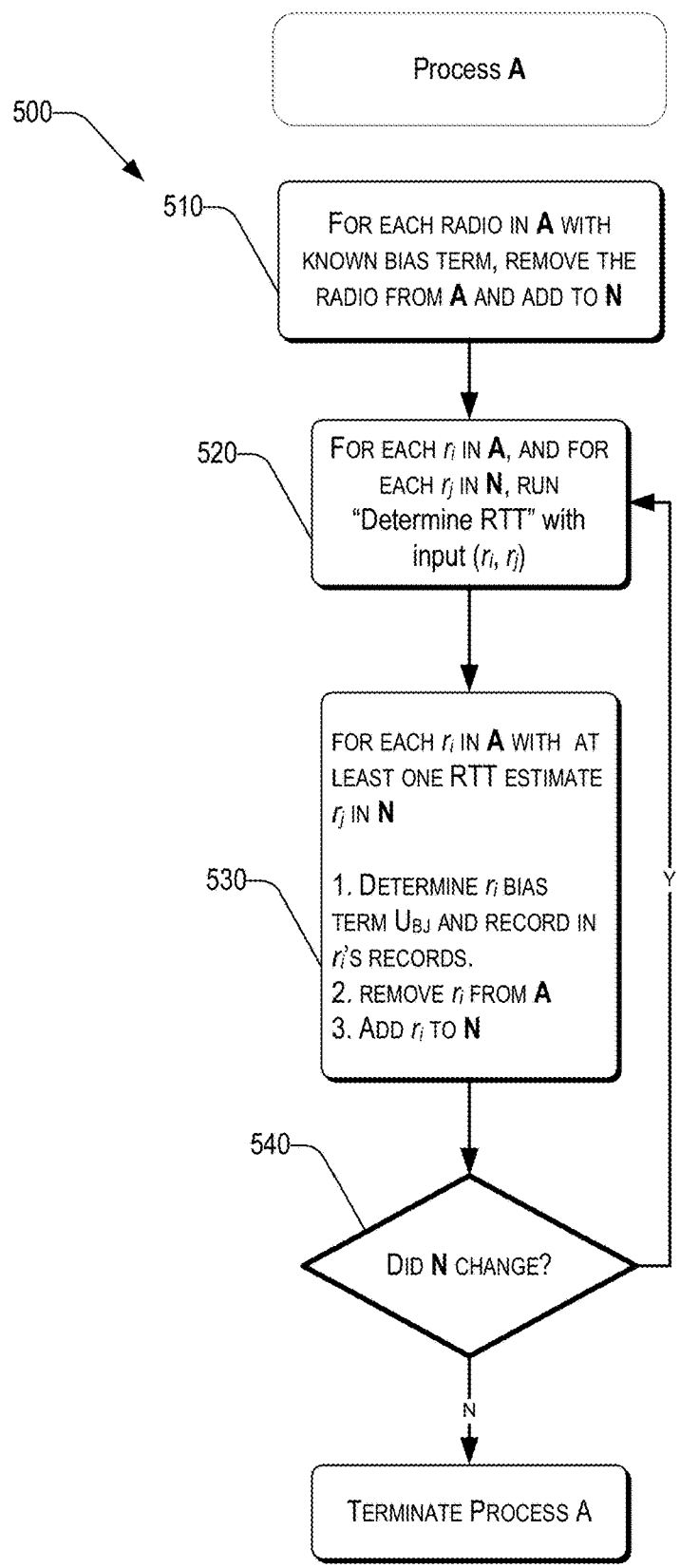
FIG. 5 is a flowchart of a process for generating an administrative set of radios according to an illustrative embodiment of the subject technology.

Referring now to FIG. 5, a process 500 for moving those radios in set "A" to set "N" is shown according to an illustrative embodiment. The process 500 is a detailed breakdown of block 360 of FIG. 3B and block 460 in FIG. 4B according to an embodiment. In general, process 500 (sometimes referred to as Process "A" throughout the disclosure), is performed to identify radios whose bias terms and coordinate locations can be calculated and used in the nucleus set "N". Those radios in set "N" have recorded accurate locations which may be used to determine the location of an external radio (for example, wireless radio device 105) requesting access to the network.

For each radio in "A" with a known bias term, remove 510 the radio from "A" and add to "N". The next step is to move 520 those radios in "A" to "N", if there is a radio in "N" for which determining the RTT may obtain an RTT estimate. For each $r_i$ in Set "A" with at least one RTT estimate 530 $r_j$ in set "N". Determine $r_i$ bias term $U_{BJ}$ and record in $r_i$'s records. Remove $r_i$ from set "A". Add $r_i$ to set "N". A check may be made 540 to determine whether the set "N" changed. If radios that are in set "A" are exhausted that can be added to set "N", then the process may terminate. Otherwise, the process may iterate at step 520.

Labeling the radio in set "A" $r_a$, and the radio in set "N" with for which the process is able to determine the RTT, the following are the knowns and unknowns:

For $r_a$
Knowns: x, y, z
Unknowns: $u_{ta}$, $u_{ra}$, $u_{ba}$
For $r_b$
Knowns: x, y, z, $u_{bb}$, potentially $u_{ta}$ and $u_{ra}$.
Unknowns: potentially $u_{ta}$ and $u_{ra}$.
Also known is rtt($r_a$, $r_b$)
The following equation yields $u_{ba}$.

$$\frac{2*\sqrt{(x_a - x_b)^2 + (y_a - y_b)^2 + (z_a - z_b)^2}}{c} + u_{ba} + u_{bb} = rtt(r_a, r_b)$$

where c=speed of light, for any $r_b \in$ set "N" such that rtt($r_a$, $r_b$) succeeds.

Figure 6:
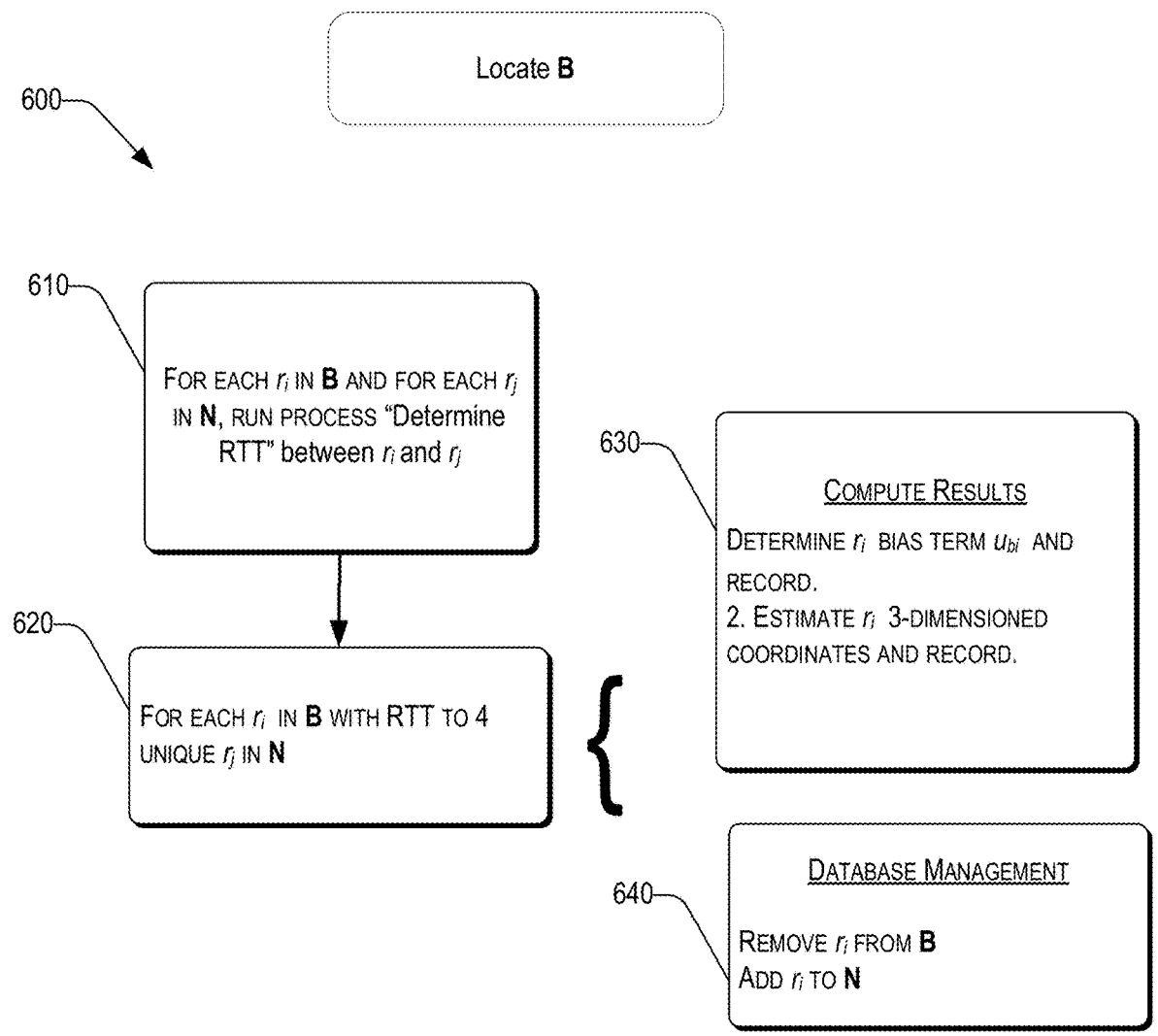
FIG. 6 is a flowchart of a process for locating a beginning set of radios according to an illustrative embodiment of the subject technology.

Referring now to FIG. 6, a beginning process 600 for locating the radios in set "B" is shown according to an illustrative embodiment. The process 600 is a detailed breakdown of block 370 of FIG. 3B according to one embodiment. It may be that there are some radios left in the Administrative set "A". A process may be invoked which reprocesses Set "A" to find radios that can be moved into Set "B". When a nucleus of radios has been established, it is now possible to go through Set "B" and calculate the radio locations to figure out error terms. As this process is performed, new information becomes available to update the nucleus. The nucleus can then be checked for radios that have new information that can be used to determine neighboring radio's locations with improved accuracy. If some radios are found to not have enough neighbors, the administrator may be notified which radios could be added to Administrative Set "A" to track which radios have insufficient location data.

The beginning process first determines 610 the round trip time $rtt(r_i, r_j)$ for all radios $r_i$ in set "A", and all radios $r_j$ in set "N". Each radio $r_i$ in set "B" is determined 620 that can be found with the RTT process (See for example, FIG. 7) for at least four distinct, neighboring radios rj in Set "N". For radios identified with an RTT to four unique radios in set "N", in some embodiments, a step 630 may include determining a bias term and estimating a location (for example, locating the three-dimensional coordinates) for the radio(s). Some embodiments include removing the radio from set "B" and adding the radio to set "N" when the bias term(s) and location of the radio is determined. For each $r_i$ that have RTT estimates for four unique radios rj in set "N", the following equations that follow are illustrative of equations that may be solved to provide the radio locations:

$$\frac{2*\sqrt{(x_i-x_{j1})^2+(y_r-y_{j1})^2+(z_i-z_{j1})^2}}{c}+u_{bi}+u_{bj1}=rtt(r_i,r_{j1})$$

$$\frac{2*\sqrt{(x_i-x_{j2})^2+(y_r-y_{j2})^2+(z_i-z_{j2})^2}}{c}+u_{bi}+u_{bj2}=rtt(r_i,r_{j2})$$

$$\frac{2*\sqrt{(x_i-x_{j3})^2+(y_r-y_{j3})^2+(z_i-z_{j3})^2}}{c}+u_{bi}+u_{bj3}=rtt(r_i,r_{j3})$$

$$\frac{2*\sqrt{(x_i-x_{j4})^2+(y_r-y_{j4})^2+(z_i-z_{j4})^2}}{c}+u_{bi}+u_{bj4}=rtt(r_i,r_{j4})$$

The following have known values:

$x_{j1}$, $x_{j2}$, $x_{j3}$, $x_{j4}$, $y_{j1}$, $y_{j2}$, $y_{j3}$, $y_{j4}$, $z_{j1}$, $z_{j2}$, $z_{j3}$, $z_{j4}$, $u_{bj1}$, $u_{bj2}$, $u_{bj3}$, $u_{bj4}$, $rtt(r_i, r_{j1})$, $rtt(r_i, r_{j2})$, $rtt(r_i, r_{j3})$, $rtt(r_i, r_{j4})$, and c.

The remaining unknowns are $x_i$, $y_i$, $z_i$, and $u_{bi}$.

Search processes as are known in the art may be used to identify the unknowns that optimize the solution. In practice, it is typical that the z coordinate is uniform or known, and as such it is possible to eliminate the need for one of the equations.

Figure 7:
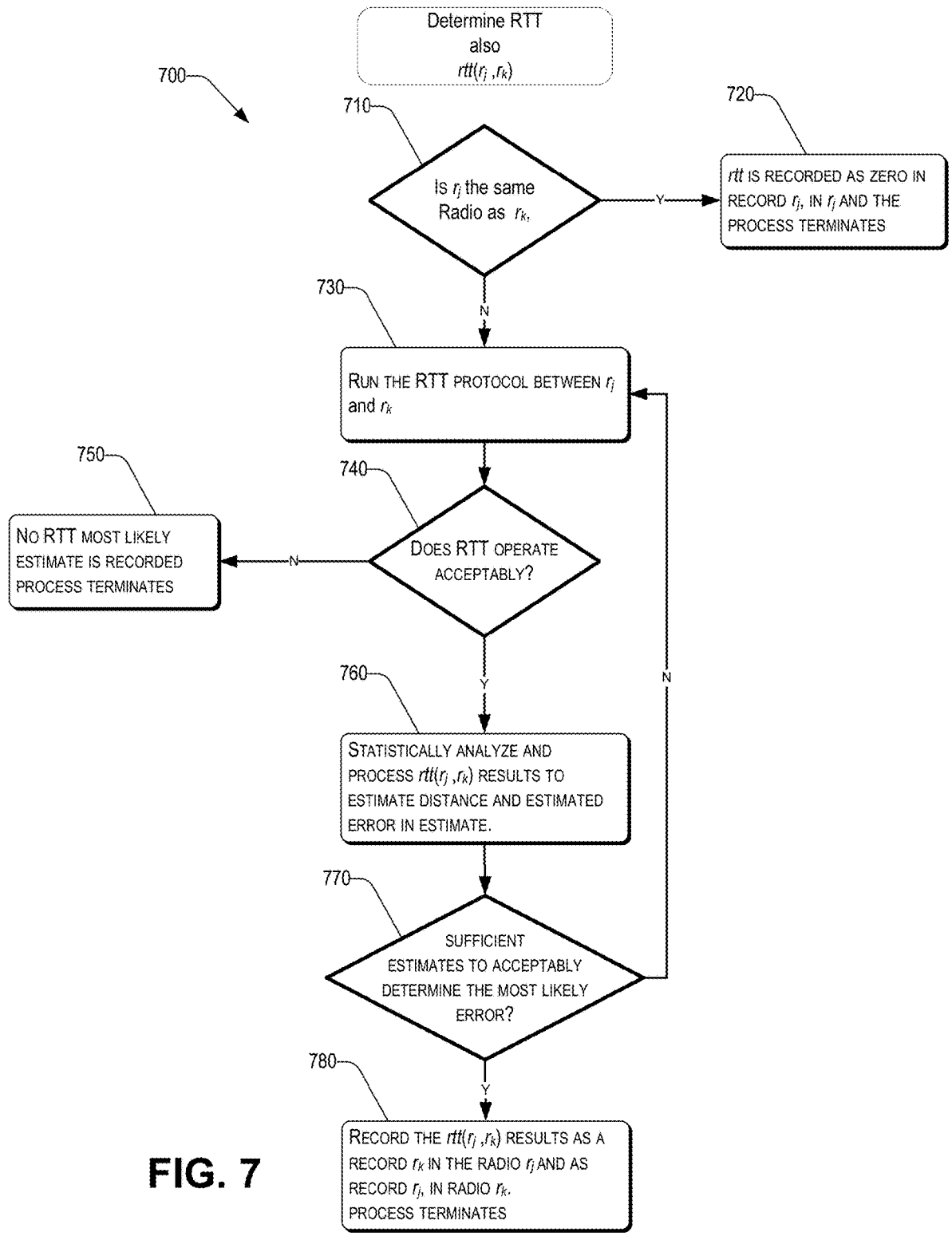
FIG. 7 is a flowchart of a process for determining round trip times for a set of radios according to an illustrative embodiment of the subject technology.

FIG. 7 shows a process 700 for determining RTT between a pair of radios according to an illustrative embodiment of the subject technology. The process 700 is used throughout the other processes as shown in block 480 of FIG. 4B, block 520 of FIG. 5, and block 610 of FIG. 6. An initial step determines 710 whether a radio $r_j$ under evaluation is the same radio as $r_k$. For instances where the radio is the same, the entry may be recorded 720 as zero. For different radios, the RTT protocol is run 730 between radio $r_j$ and $r_k$. A determination 740 is made of whether RTT operates acceptably. The determination 740 may include detection of non-line of sight results, such as those identified with the use of Channel State Information, to be able to detect direct signals from those that are reflected signals, and so the RTT determination in this case may fail. In block 750, No RTT is recorded. A most likely estimate is recorded. The process terminates. For an acceptable RTT operation, $rtt(r_j, r_k)$ may be statistically analyzed 760 and processed to estimate distance and estimate error. The process may determine 770 whether there are sufficient estimates to acceptably determine the most likely error. Record the $rtt(r_j, r_k)$ results as a record $r_k$ in the radio $r_j$ and as a record $r_j$ in the radio $r_k$.

As will be appreciated, embodiments of the subject technology enable the use of RTT to determine for example, client locations, by eliminating the bias terms in signals. The accuracy in location finding will be acceptable under newer protocols in the field of radio telemetry. Moreover, the embodiments provide the ability to reduce error bias during actual operation of radio devices, which avoids the costs of factoring error factor values into each physical device at the manufacturing level.

Some examples of technologies that maybe compatible with and/or implement the subject technology include: cellular technologies, including cellular 3G, 4G, and 5G; Bluetooth™ 2.4 Mhz technologies; 900 Mhz technologies such as Smartgrid™, and home automation technology; and other current or future RTT compatible technologies used in conjunction with radios that have biases introduced during manufacturing and other processes.

As will be appreciated by one skilled in the art, aspects of the disclosed invention may be embodied as a system, method or process, or computer program product. Accordingly, aspects of the disclosed invention may take the form of an entirely hardware embodiment, an entirely software embodiment (including firmware, resident software, microcode, etc.) or an embodiment combining software and hardware aspects that may all generally be referred to herein as a "circuit," "module," or "system." Furthermore, aspects of the disclosed technology may take the form of a computer program product embodied in one or more computer readable media having computer readable program code embodied thereon.

Any combination of one or more computer readable media may be utilized. In the context of this disclosure, a computer readable storage medium may be any tangible or non-transitory medium that can contain or store a program for use by or in connection with an instruction execution system, apparatus, or device. A computer readable storage medium may be, for example, but not limited to, an electronic, magnetic, optical, electromagnetic, infrared, or semiconductor system, apparatus, or device, or any suitable combination of the foregoing.

Aspects of the disclosed invention are described above with reference to block diagrams of methods, apparatus (systems) and computer program products according to embodiments of the invention. It will be understood that each block of the block diagrams, and combinations of blocks in the flowchart illustrations and/or block diagrams, can be implemented by computer program instructions. These computer program instructions may be provided to the processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A method of determining wireless radio locations, comprising:
   identifying a group of location fixed radios in a network;
   identifying one or more fixed radios in the network with known location coordinates;
   associating the radios with known location coordinates into a group;
   constructing one or more sets of three radios from the group of radios with known location coordinates;
   performing a round trip time (RTT) measurement for each radio in the sets of three radios;
   calculating timing bias error values for radios in the sets of three radios;
   moving radios with calculated timing bias error values into the group of radios with known location coordinates and known timing bias error values;
   determining RTT values between each radio in the group of radios with known location coordinates and known timing bias error values and radios outside the group of radios with known location coordinates and known timing bias error values;
   determining timing bias error values for each radio outside the group of radios with known location coordinates and known timing bias error values, wherein the timing bias error value for each radio outside the group of radios with known location coordinates and known timing bias error values is based on the determined RTT values; and
   estimating location coordinates for each radio outside the group of radios with known location coordinates and known timing bias error values.

2. The method of claim 1, wherein the step of estimating location coordinates further comprises selecting one of the radios outside the group of radios with known location coordinates and known timing error bias values and identifying RTT between the selected radio and four neighboring, unique radios from the group of radios with known location coordinates and known timing error bias values.

3. The method of claim 1, further comprising moving radios with estimated location coordinates into the group of radios with known location coordinates and known timing error bias values.

4. The method of claim 1, further comprising:
   iterating the steps of determining timing bias error values for additional radios outside the group of radios with known location coordinates and known timing bias error values and estimating coordinate locations; and
   increasing a number of the group of radios with known location coordinates and known timing error bias values in the network as new radios with known timing bias error values and known coordinate locations are determined.

5. The method of claim 1, further comprising solving for unknown error bias values and unknown coordinate locations using non-linear equations.

6. The method of claim 1, further comprising:
   receiving a request for access to the network from a mobile radio device; and
   using the known location coordinates and estimated location coordinates of radios to determine a distance of the mobile radio device from one of the location fixed radios and a timing error associated with the mobile radio device.

7. The method of claim 6, wherein an accuracy of the determined distance between the mobile radio device and one of the location fixed radios is based on timing bias error values on the order of picosecond resolution.

8. The method of claim 1, further comprising:
   determining that a coordinate location for one of the radios, outside the group of radios with known location coordinates and known timing bias error values, cannot be found; and
   reporting to an administrative server, an identify of the radio with a coordinate location that cannot be found.

9. A computer program product for determining wireless radio locations, the computer program product comprising:
   one or more non-transitory computer readable storage media, and program instructions collectively stored on the one or more non-transitory computer readable storage media, the program instructions, when executed by a processor, comprising:
   identifying a group of location fixed radios in a network;
   identifying one or more fixed radios in the network with known location coordinates;
   associating the radios with known location coordinates into a group;
   constructing one or more sets of three radios from the group of radios with known location coordinates;
   performing a round trip time (RTT) measurement for each radio in the sets of three radios;
   calculating timing bias error values for radios in the sets of three radios;
   moving radios with calculated timing bias error values into the group of radios with known location coordinates and known timing bias error values;
   determining RTT values between each radio in the group of radios with known location coordinates and known timing bias error values and radios outside the group of radios with known location coordinates and known timing bias error values;
   determining timing bias error values for each radio outside the group of radios with known location coordinates and known timing bias error values, wherein the timing bias error value for each radio outside the group of radios with known location coordinates and known timing bias error values is based on the determined RTT values; and
   estimating location coordinates for each radio outside the group of radios with known location coordinates and known timing bias error values.

10. The computer program product of claim 9, wherein in the step of estimating location coordinates, the computer instructions further comprise selecting one of the radios outside the group of radios with known location coordinates and known timing error bias values and identifying RTT between the selected radio and four neighboring, unique radios from the group of radios with known location coordinates and known timing error bias values.

11. The computer program product of claim 9, wherein the computer program instructions further comprise moving radios with estimated location coordinates into the group of radios with known location coordinates and known error bias values.

12. The computer program product of claim 9, wherein the computer program instructions further comprise:
- iterating the steps of determining timing bias error values for additional radios outside the group of radios with known location coordinates and known timing bias error values and estimating coordinate locations; and
- increasing a number of the group of radios with known location coordinates and known timing error bias values in the network as new radios with known timing bias error values and known coordinate locations are determined.

13. The computer program product of claim 9, wherein the computer program instructions further comprise solving for unknown error bias values using non-linear equations.

14. The computer program product of claim 9, wherein the computer program instructions further comprise:
- receiving a request for access to the network from a mobile radio device; and
- using the known location coordinates and estimated location coordinates of radios to determine a distance of the mobile radio device from one of the location fixed radios and a timing error associated with the mobile radio device.

15. The computer program product of claim 14, wherein an accuracy of the determined distance between the mobile radio device and one of the location fixed radios is based on timing bias error values on the order of picosecond resolution.

16. The computer program product of claim 9, wherein the computer program instructions further comprise:
- determining that a coordinate location for one of the radios, outside the group of radios with known location coordinates and known timing bias error values, cannot be found; and
  - reporting to an administrative server, an identify of the radio with a coordinate location that cannot be found.

17. A network location computer server, comprising:
- a network connection;
- one or more non-transitory computer readable storage media;
- a processor coupled to the network connection and coupled to the one or more non-transitory computer readable storage media; and
- a computer program product comprising program instructions collectively stored on the one or more non-transitory computer readable storage media, the program instructions, when executed by the processor, comprising:
- identifying a group of location fixed radios in a network;
- identifying one or more fixed radios in the network with known location coordinates;
- identifying radios with known timing bias error values;
- associating the radios with known location coordinates and known error bias values into a group;
- for radios outside of the radios with known location coordinates and known timing bias error values, constructing one or more sets of three radios;
- performing a round trip time (RTT) measurement between each pair of radios in each set of three radios;
- calculating timing bias error values for radios in the sets of three radios;
- moving radios with calculated timing bias error values into the group of radios with known location coordinates and known timing bias error values;
- determining RTT values between each radio in the group of radios with known location coordinates and known timing bias error values and radios outside the group of radios with known location coordinates and known timing bias error values;
- determining timing bias error values for each radio outside the group of radios with known location coordinates and known timing bias error values, wherein the timing bias error value for each radio outside the group of radios with known location coordinates and known timing bias error values is based on the determined RTT values;
- estimating location coordinates for each radio outside the group of radios with known location coordinates and known timing bias error values;
- receiving a request for access to the network from a mobile radio device; and
- using the known location coordinates and estimated location coordinates of radios to determine a distance of the mobile radio device from one of the location fixed radios.

18. The network location computer server of claim 17, wherein the computer program instructions further comprise:
- iterating the steps of determining timing bias error values for additional radios outside the group of radios with known location coordinates and known timing bias error values and estimating coordinate locations; and
- increasing a number of the group of radios with known location coordinates and known timing error bias values in the network as new radios with known timing bias error values and known coordinate locations are determined.

19. The network location computer server of claim 17, wherein the computer program instructions further comprise:
- receiving a request for access to the network from a mobile radio device; and
- using the known location coordinates and estimated location coordinates of radios to determine a distance of the mobile radio device from one of the location fixed radios and a timing error associated with the mobile radio device.

20. The network location computer server of claim 17, wherein the computer program instructions further comprise:
- determining that a coordinate location for one of the radios, outside the group of radios with known location coordinates and known timing bias error values, cannot be found; and
- reporting to an administrator, an identify of the radio with a coordinate location that cannot be found.

* * * * *